United States Patent [19]

Saeki et al.

[11] Patent Number: 4,658,493
[45] Date of Patent: Apr. 21, 1987

[54] TOOL STORING APPARATUS

[75] Inventors: Hideki Saeki; Isao Kanematsu, both of Inuyama, Japan

[73] Assignee: Yamazaki Machinery Works, Ltd., Niwa, Japan

[21] Appl. No.: 762,836

[22] Filed: Aug. 6, 1985

[30] Foreign Application Priority Data

Aug. 10, 1984 [JP] Japan ................................ 59-168647
Aug. 10, 1984 [JP] Japan ................................ 59-168648
Aug. 14, 1984 [JP] Japan ................................ 59-169844
Aug. 14, 1984 [JP] Japan ................................ 59-169845

[51] Int. Cl.$^4$ .......................................... B23Q 3/157
[52] U.S. Cl. .......................................... 29/568; 211/1.5
[58] Field of Search ............................ 29/568; 211/1.5

[56] References Cited

U.S. PATENT DOCUMENTS

| 3,780,423 | 12/1973 | Lilientha et al. | 29/568 |
|---|---|---|---|
| 3,851,380 | 12/1974 | Kurimoto et al. | 29/568 |
| 4,412,772 | 11/1983 | Naito et al. | 211/1.5 X |
| 4,520,551 | 6/1985 | Imhof | 29/568 |
| 4,545,107 | 10/1985 | Bellman et al. | 29/568 |

FOREIGN PATENT DOCUMENTS

| 1910553 | 9/1970 | Fed. Rep. of Germany | 29/568 |
|---|---|---|---|
| 3023539 | 1/1982 | Fed. Rep. of Germany | 29/568 |
| 3022717 | 1/1982 | Fed. Rep. of Germany | 29/568 |
| 2391028 | 1/1979 | France | 211/1.5 |
| 56-82146 | 7/1981 | Japan | 29/568 |
| 303620 | 9/1968 | Sweden | 211/1.5 |
| 2073626 | 10/1981 | United Kingdom | 29/568 |

Primary Examiner—William R. Briggs
Attorney, Agent, or Firm—Cushman, Darby & Cushman

[57] ABSTRACT

A tool storing apparatus is disclosed. It includes a frame. The frame is provided with guide means. The guide means is movably provided with a plurality of tool racks in the shape of a band plate. The tool racks are provided with a plurality of tool pockets for storing tools and arranged in the longitudinal direction of the tool racks. The tools are stored in the tool pockets of the respective tool racks. When the tools are inserted therein and pulled off therefrom, the corresponding tool racks are moved in order to prevent occurrence of interference between the tool racks and the tools attached thereto, and means for delivering and feeding the tools.

4 Claims, 18 Drawing Figures

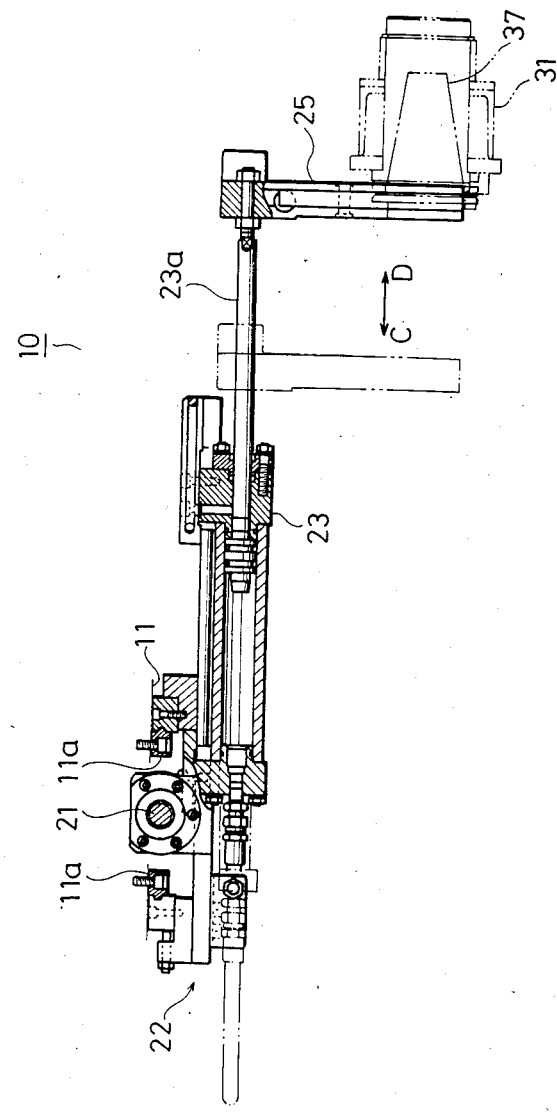

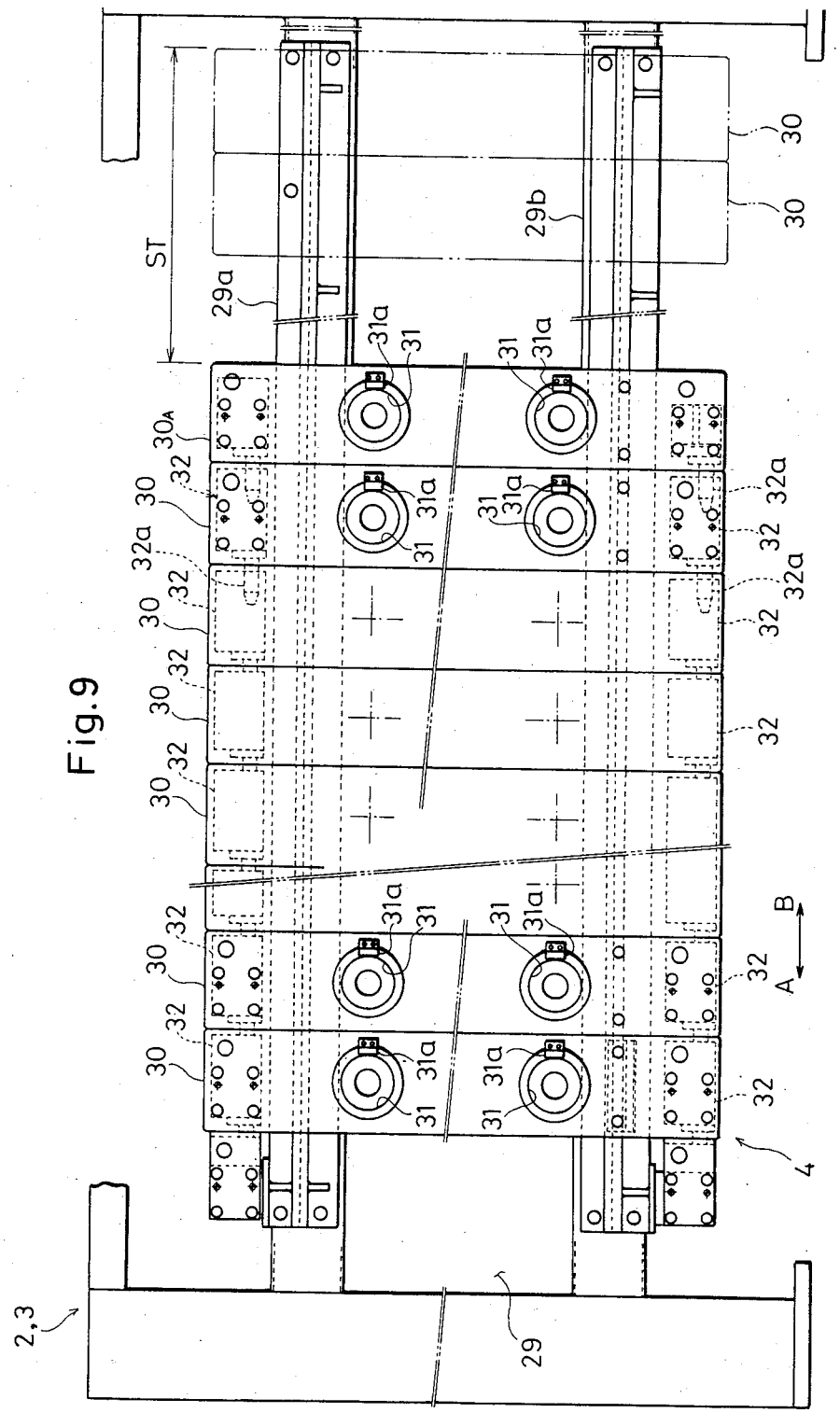

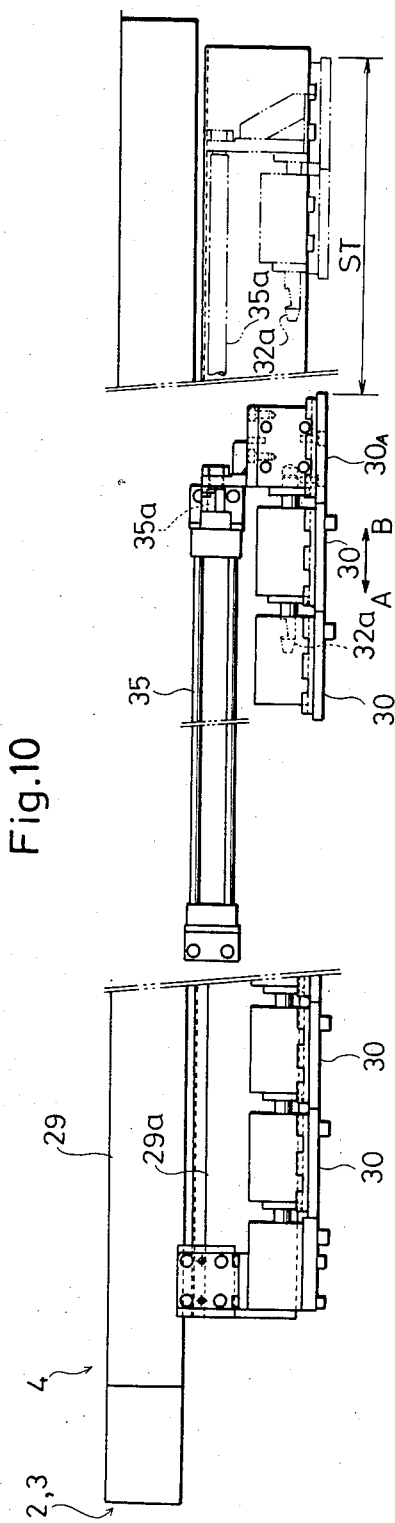

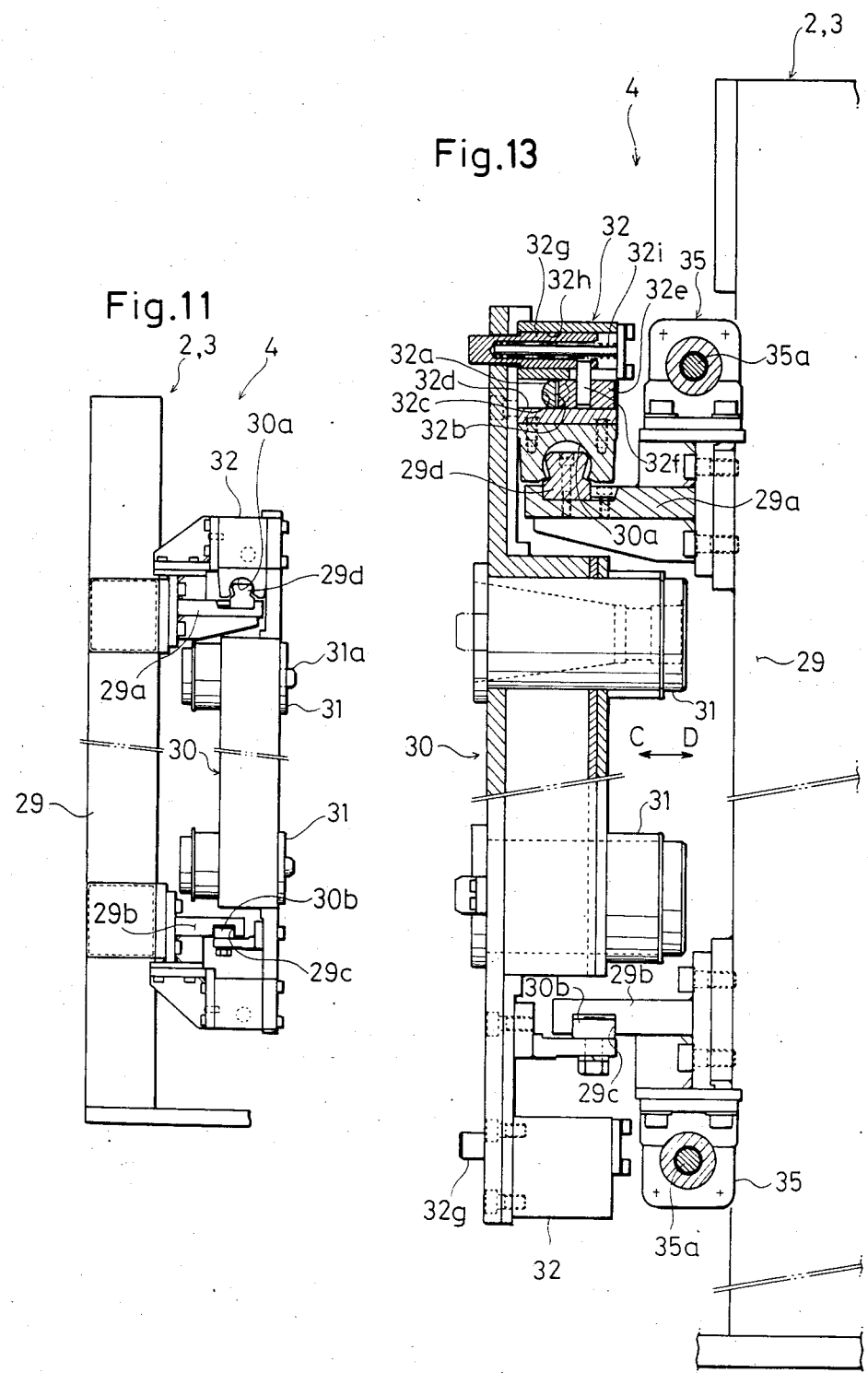

TOOL STORING APPARATUS

CROSS REFERENCE TO RELATED APPLICATION

The subject matter of this application is generally related to the subject matter of Ser. No. 762,835, filed Aug. 6, 1985, for TOOL STORING AND FEEDING APPARATUS AND METHOD THEREOF, although there is a clear line of demarcation between the claims of the two applications.

BACKGROUND OF THE INVENTION

This invention relates to a tool storing apparatus which is suitably applicable to a tool storing and feeding apparatus for feeding tools to a machine tool such as a machining center and the like.

Heretofore, a drum-shaped tool magazine, a chain type tool magazine, etc. are known as a tool storing apparatus of the type set forth above. However, they are limited to several tens in number of tools which they can store and feed.

In recent years, however, a machining by machine tool without using a man power has been prevailed. In such a case, in order to process a number of various kinds of works, tools which are required to feed to a machine tool is increased in number tremendously. Therefore, conventional tool storing and feeding apparatuses which are capable of feeding only several tens of tools are no more effective in performing a satisfactory processing work.

In view of the foregoing, there are proposed several types of tool storing and feeding apparatuses. One such example is of the type which includes a plurality of tool magazines of a drum shape, wherein a number of tools are fed while replacing the magazines with respect to a machine tool. Another example is a chain type tool magazine, wherein the length of a chain is extended in order to store a number of tools. A still further example is of the type, wherein a plurality of chain type tool magazines are arranged in a parallel relation. However, they still have such a disadvantage as that they are not practical when used for feeding from one hundred to several hundreds of tools, since many problems are involved, e.g. that a long time is required for feeding the tools to the machine tool, that a large space is required for installation thereof, etc.

Also, there is another effective proposal, wherein tools are stored on a storing shelf formed in three dimensions beforehand, and the tools are delivered by means for delivering and feeding tools such as a delivery robot. However, in this device, a sufficient space is required to maintain in order to avoid interference between the robot and the adjacent tools at the time when a tool stored on the shelf is taken out and stored, which prohibits the tools to store in high density. Therefore, where hundreds of tools are required to store, there often arises an installation space problem.

SUMMARY OF THE INVENTION

It is therefore an object of the present invention to provide a tool storing apparatus, wherein a large number of tools can be stored in high density and therefore in a limited space while preventing occurrence of interference between tools and means for delivering and feeding the tools in advance.

That is, the present invention includes a frame, said frame being provided with guide means, said guide means movably provided with a plurality of tool racks in the shape of a band plate, said tool racks being provided with a plurality of tool pockets for storing tools therein arranged in the longitudinal direction thereof.

Furthermore, the present invention includes a frame and a plurality of tool racks in the shape of a band plate, said frame being provided with guide means, said guide means being movably provided with said tool racks, said frame being fixedly provided with at least one tool rack, all of said tool racks being arranged in the longitudinal direction thereof with a plurality of tool pockets for storing tools therein.

Also, the present invention includes a frame, said frame being provided with guide means, said guide means being movably provided with a plurality of tool racks in the shape of a band plate, said tool racks being provided with a plurality of tool pockets for storing tools therein arranged in the longitudinal direction thereof, said tool racks being further provided with a connecting mechanism for interconnecting said tool racks adjacent with respect to one another, at least one of said tool racks being provided with driving means for moving said tool racks.

Furthermore, the present invention includes a frame, said frame being provided with guide means, said guide means being movably provided with a plurality of tool racks in the shape of a band plate, said tool racks being provided with a plurality of tool pockets for storing tools therein arranged in the longitudinal direction thereof, said tool racks being further provided with connecting mechanism for interconnecting said tool racks adjacent with respect to one another, at least one of said tool racks being provided with driving means for moving said tool racks, said frame being further movably provided with means for delivering and feeding tools, said delivery and feed means being provided with means for canceling the connected state of said connecting mechanism.

Constitutions of other preferred embodiments will be described in the following detailed description of the embodiments.

BRIEF DESCRIPTION OF THE DRAWINGS

FIG. 7 is a plan view of FIG. 6;

FIG. 8 is a view of a tool grasping member when viewed from the direction as shown by the arrow VIII in FIG. 6;

FIG. 9 is a front view of a tool rack portion;

FIG. 10 is a plan view of FIG. 9;

FIG. 11 is a side view of FIG. 9;

FIG. 13 is a side view of FIG. 12;

DESCRIPTION OF THE PREFERRED EMBODIMENTS

Figure 1:
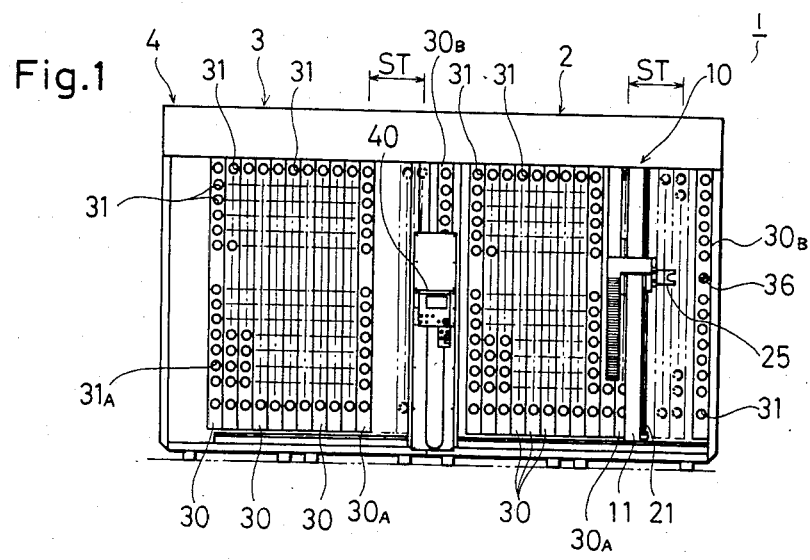
FIG. 1 is a front view showing one embodiment of the present invention applied to a tool storing and feeding apparatus.
Figure 4:
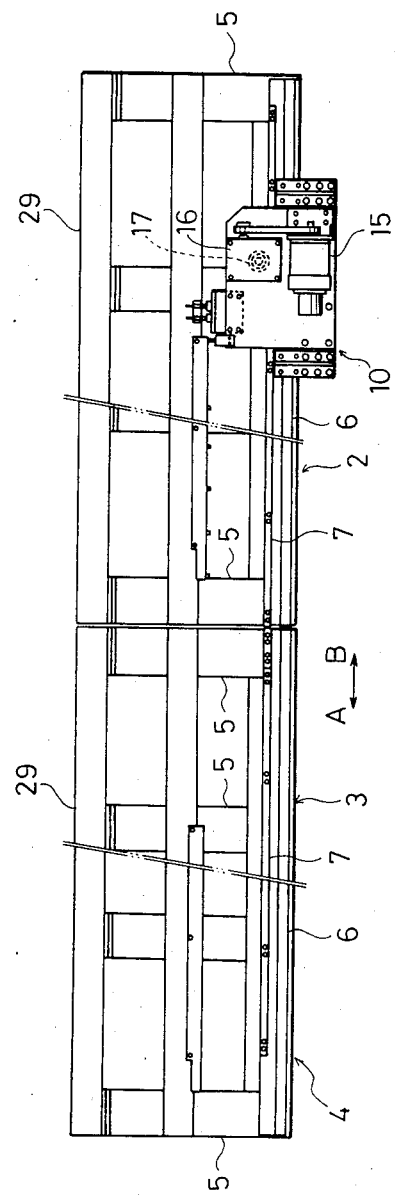
FIG. 4 is a plan view of FIG. 3.
Figure 5:
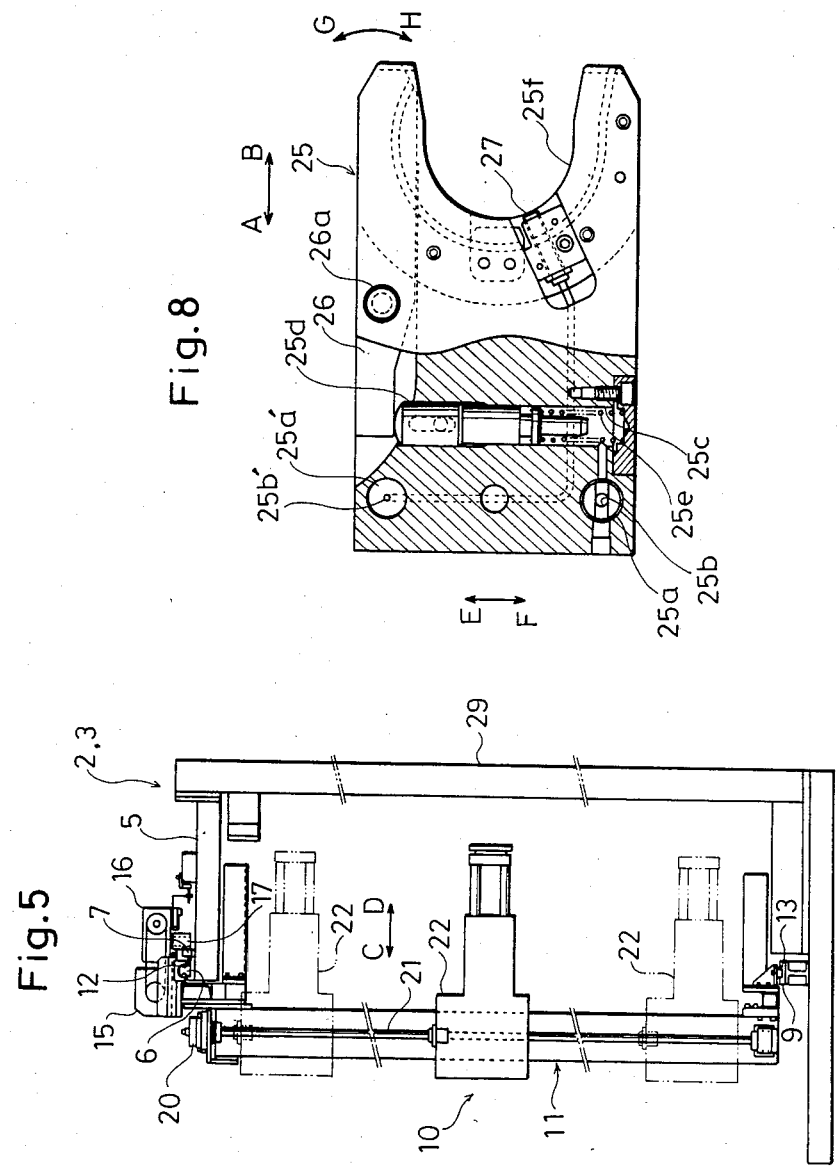
FIG. 5 is a side view of FIG. 3.

A tool storing and feeding apparatus 1, as shown in FIG. 1, includes a main frame 2 and a sub-frame 3 connected to the left part of the main frame 2. They form a part of a tool storing apparatus 4. The main frame 2 and the sub-frame 3 are, as shown in FIG. 5, formed with a bracket 5 at the upper portions thereof. Disposed at a tip portion of the bracket 5 is a guide rail 6 extending in the right and left direction in FIGS. 3 and 4 transversing the main frame 2 and the sub-frame 3. The bracket 5 is further provided with a rack 7 disposed likewise in the right and left direction in FIGS. 3 and 4 along the guide rail 6. Also, the main frame 2 and the sub-frame 3 are provided at the lower portions thereof with a guide rail 9 in parallel with the guide rail 6. A tool robot 10 serving as means delivering and feeding tools is movably mounted on the guide rails 6 and 9 for movement in the directions as shown by arrows A and B in FIG. 3 through a guide groove 12 and a guide roller 13 which are provided in a main body 11 of the tool robot 10. The main body 11 is provided at its upper portion with a motor 15. The motor 15 is rotatably provided with a pinion gear 17 through power transmitting means such as a speed reducing apparatus 16, etc. The pinion gear 17 is meshed with the rack 7. Accordingly, the main body 11 is moved in the directions as shown by the arrows A and B along the rack 7 guided by the guide rails 6 and 9 in accordance with normal and reverse rotation of the motor 15 through the speed reducing apparatus 16 and the pinion gear 17.

Figure 6:
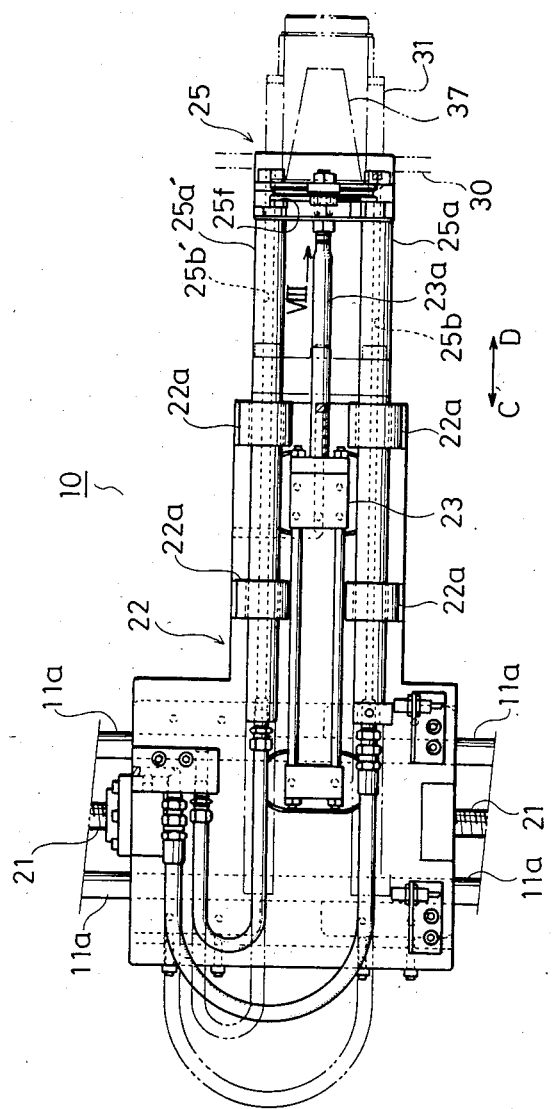
FIG. 6 is a front view showing a hand portion of the tool robot.

Also, the main body 11 is provided with a motor 19. The motor 19 is connected at its upper end portion to a feed screw 21 rotatably supported by the main body 11 in the vertical direction in FIG. 3, through power transmitting means such as a timing belt 20, etc. The feed screw 21 is threadedly engaged with a hand mechanical portion 22. The hand mechanical portion 22 is movably engaged with a pair of guide rails 11a formed in parallel with the feed screw 21 on the main body 11 for movement in the right perpendicular direction with respect to the paper surface in FIG. 7, that is, in the disposed direction of the feed screw 21. The hand mechanical portion 22 is provided with a hydraulic cylinder 23 with a piston rod 23a for reciprocally projecting in the directions as shown by arrows C and D. Moreover, the hand mechanical portion 22 is provided, as shown in FIG. 6, with a plurality of slide bearings 22a. The slide bearings 22a are movably provided with a tool grasping member 25 for movement in the directions as shown by the arrows C and D, through guide rods 25a and 25a' slidably mounted on the slide bearings 22a. The guide rods 25a is formed with a throughhole 25b along its center for feeding pressure oil to the tool grasping member 25. Furthermore, the guide rod 25a' is formed with a hole 25b' for containing a cord to be connected to a proximity sensor as will be described later. A front end of the piston rod 23a is fixedly secured to the tool grasping member 25.

Also, the tool grasping portion 25 is formed, as shown in FIG. 8, with a cylinder 25c communicating with the hole 25b formed in the guide rod 25a. The cylinder 25c is movably provided with a piston 25d for movement in the directions as shown by arrows E and F. Interposed between the piston 25d and the cylinder 25c is a coil spring 25e in its depressed state for normally energizing the piston 25d in the direction as shown by an arrow E. Also, the tool grasping portion 25 is pivotably provided with an arm 26 for pivoting in the directions as shown by the arrows G and H through a pin 26a. The left end of the arm 26 in FIG. 8 is in abutting contact with the front end of the piston 25d. Furthermore, the tool grasping portion 25 is provided with a proximate sensor 27 with its front end facing toward a tool grasping groove 25f formed in the tool grasping member 25 in a generally U-shape. The proximate sensor 27 is adapted to detect whether a tool is in the tool gasping groove 25f.

On the other hand, a side plate 29 of the main frame 2 and the sub-frame 3 is provided, as shown in FIGS. 9 and 11, at its upper and lower portions with brackets 29a and 29b, respectively, in the travelling directions of the tool robot 10 as shown by the arrows A and B. The lower bracket 29b is formed with a guide groove 29c extending in the directions A and B. Furthermore, the upper bracket 29a is provided with a guide rail 29d likewise extending in the directions A and B. A plurality of tool racks 30 in the shape of an elongated band plate are movably supported by the guide rail 29d and the guide groove 29c for movement in the directions A and B, with a guide groove 30a and a guide roller 30 provided at the tool racks 30 engaged with the guide rail 29d and the guide groove 29c. Each of the tool racks 30 is provided with a plurality of tool pockets 31 for holding tools arranged in a row in the vertical direction of FIG. 9, that is, in the longitudinal direction of the tool rack 30.

Also, each of the tool pockets 31 is, as shown in FIG. 9, provided with a locking key 31a which is engaged in a key groove formed in the tool side thereof for preventing rotation of a tool in the tool pocket 31.

Figure 12:
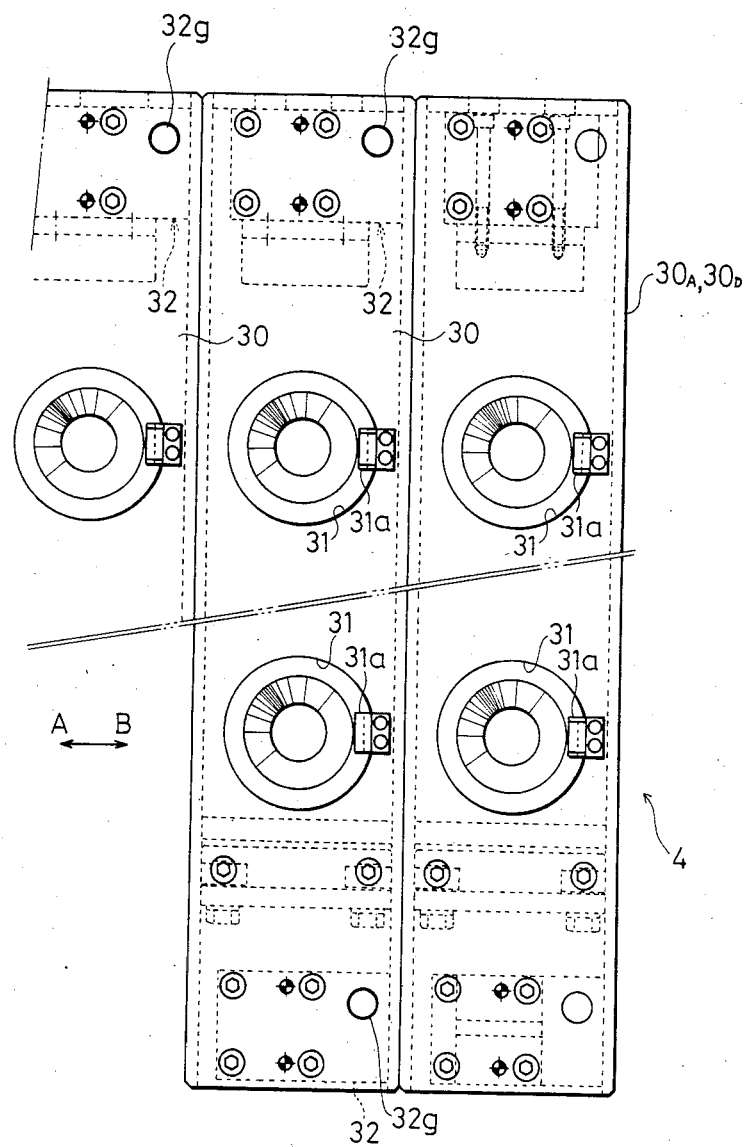
FIG. 12 is a front view showing a connected state of the tool racks.
Figure 14:
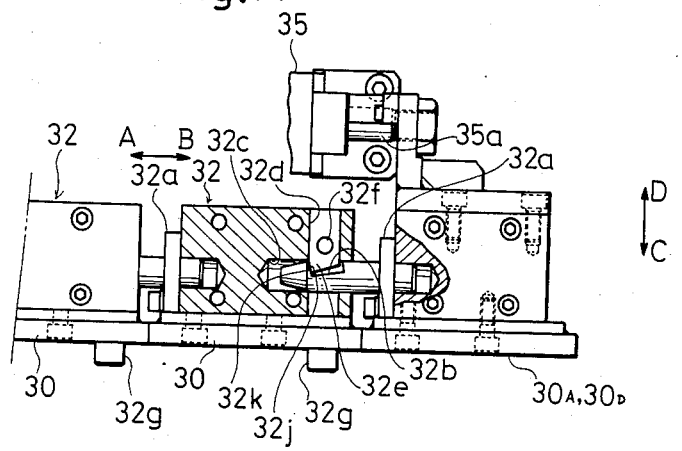
FIG. 14 is a plan view of FIG. 12.

Also, each of the tool racks 30 is provided at its upper and lower portions with a connecting mechanism 32, as shown in FIGS. 12 through 14, for connecting the tool racks 30 one another. The connecting mechanism 32 has a pin 32a fixed, with its front end projecting to the adjacent tool rack 30 to be connected. The front end portion of the pin 32a is formed with an engaging groove 32b as shown in FIG. 14. Also, the adjacent tool rack 30 is formed at a position opposite to the pin 32a with an engaging hole 32c so that the pin 32a is engaged therein. The engaging hole 32c is formed with a hole 32d in the perpendicular direction with the engaging hole 32c as shown in FIG. 13. Movably engaged in the hole 32d is a lock pin 32e for movement in the directions as shown by the arrows C and D. The lock pin 32e is planted therein with a pin 32f. The pin 32f is engaged in an unlocking pin 32g movably inserted in a hole 32h formed in parallel with the hole 32d at its upper location in FIG. 13 for movement in the directions as shown by the arrows C and D. Interposed between the unlocking pin 32g and the hole 32h is a coil spring 32i in its depressed state for normally energizing the unlocking pin 32g in the direction as shown by the arrow C.

Figure 15:
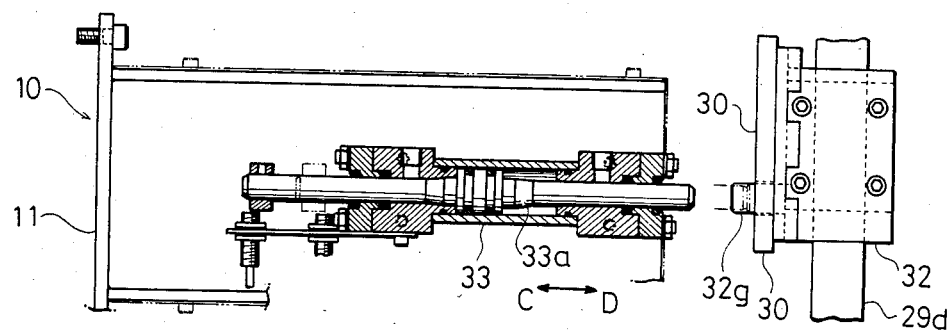
FIG. 15 is a plan view showing an unlocking mechanism of the tool robot.

The main body 11 of the tool robot 10 is provided, as shown in FIG. 15, at its upper and lower portions to be capable of opposing to the connecting mechanism 32 of the tool rack 30 with a unlocking cylinder 33 with its piston rod 33a reciprocally projecting in the directions as shown by the arrows C and D.

Among the tool racks 30 movably provided on the main frame 2 and the sub-frame 3, the tool racks $30_A$ at the second from the rightmost in FIG. 1, which are mounted on the respective frames are connected at the upper and lower portions thereof, as shown in FIG. 10, with a rack opening cylinder 35 mounted on a side plate 29 through a piston rod 35a for reciprocally projecting in the directions as shown by the arrows A and B. Accordingly, the tool racks $30_A$ are reciprocally moved in the directions A and B along the guide rail 29d etc. when the piston rod 35a is caused to reciprocally project in the directions A and B driven by the rack opening cylinder 35.

Figure 16:
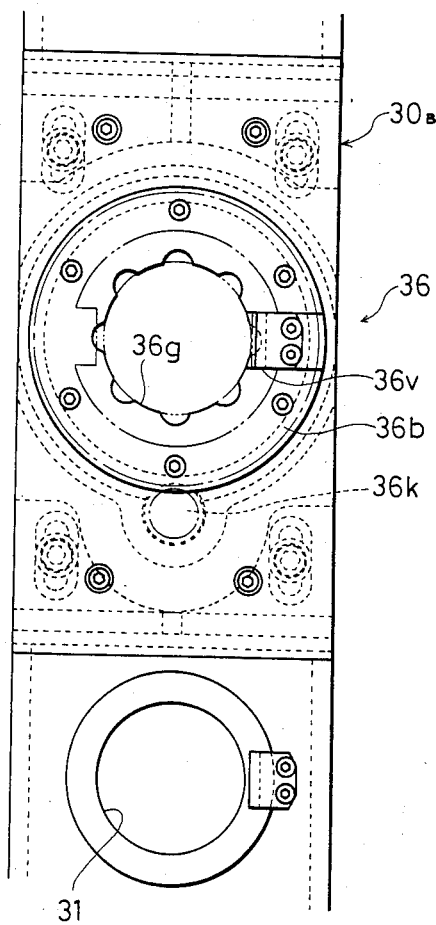
FIG. 16 is a front view showing an intermediate feed pocket.
Figure 17:
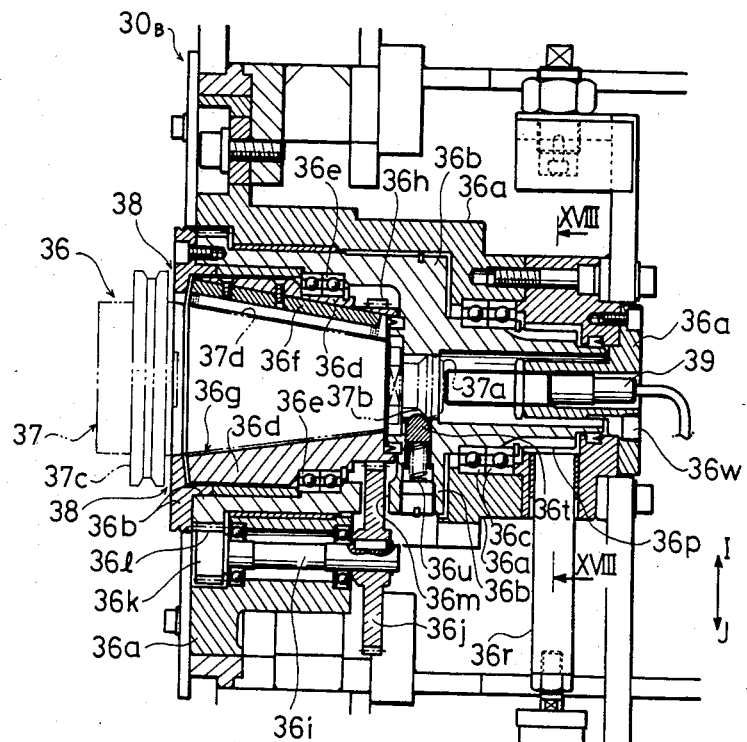
FIG. 17 is a side view of FIG. 16.
Figure 18:
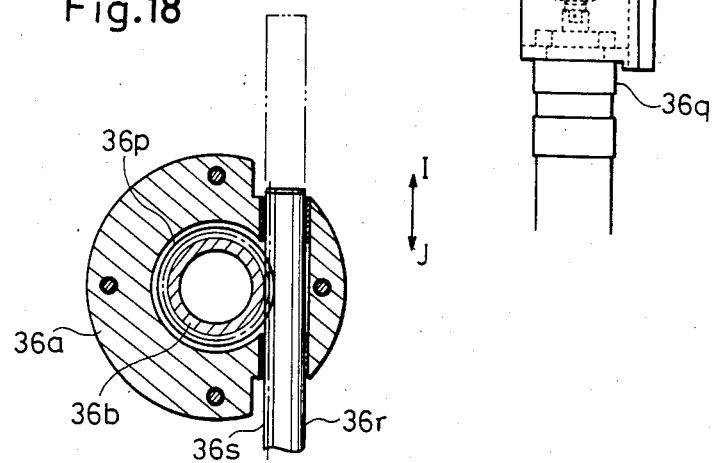
FIG. 18 is a sectional view taken on line XVIII—XVIII of FIG. 17.

The tool racks $30_B$, $30_B$ at the rightmost in FIG. 1 each on the main frame 2 and the sub-frame 3 are fixed to the side plate 29 respectively. The tool rack $30_B$ on the main frame 2 is provided with an intermediate feed pocket 36 at a generally central portion thereof. The intermediate feed pocket 36 has a frame 36a fixedly secured to the tool rack $30_B$ as shown in FIGS. 16 and 17. A rotary holder 36b is rotatably mounted on the frame 36a through a bearing 36c, etc. Furthermore, a cleaning holder 36d is rotatably mounted on the rotary holder 36b through a bearing 36e. The cleaning holder 36d is provided with a cleaning brush 36f, with the brush portion at its front end projecting to a tool holding portion 36g formed thereon in the shape of a cut cone. The cleaning holder 36d is formed on the outer periphery thereof with a gear 36h. The gear 36h is meshed with a gear 36j mounted on a shaft 36i rotatably supported by the frame 36a through a slit 36m formed in the rotary holder 36b. The other end of the shaft 36i is provided with a gear 36k which meshes with a gear 36l formed at the left end portion on the rotary holder in FIG. 17. Also, the rotary holder 36b is formed at the right end portion in the figure with a pinion gear 36p. The pinion gear 36p is meshed, as shown in FIG. 18, with a rack 36s formed on a bar-shaped rod 36r which is projectable by a cylinder 36q in the directions as shown by the arrows I and J. Also, the rotary holder 36b is movably provided with a lock pin 36t for movement in the directions as shown by the arrows I and J in FIG. 17. The lock pin 36t is energized by a coil spring 36u in the direction as shown by an arrow I. The lock pin 36t is engaged in a groove portion 37b of a pull stud 37a of a tool 37 held by the tool holding portion 36g by using an elastic property of the coil spring 36u, so that the tool 37 inserted in the tool holding portion 36g is prevented from coming off unexpectedly. Reference numeral 39 denotes a proximate sensor for detecting whether the tool 37 is inserted in the tool holding portion 36g.

Since the tool storing and feeding apparatus 1 has the above mentioned construction, feed of the tools 37 from the tool storing and feeding apparatus 1 to a machine tool such as a machining center (not shown) or the like is performed in the following manner. Firstly, based on a machining program and an operator's instructions, the tool robot 10 is suitably moved in the directions as shown by the arrows A and B in FIG. 3 along the guide rails 6 and 9 laid down on the main frame 2 and the sub-frame 3 of the tool storing apparatus 4. This movement is effected by the speed reducing apparatus 16, the pinion gear 17 and the rack 7 meshed with the pinion gear 17 by properly rotating the motor 15 on the main body 11 of the tool robot 10 either in the normal direction or in the reverse direction, as already described. The tool robot 10 is driven so far as to a position opposite to a tool rack 30 with a tool 37 to be fed to the machine tool in the directions A and B. Since the guide rails 6 and 9 are laid down penetrating through the main frame 2 and the sub-frame 3 as already described, the tool robot 10 can freely travel between the main frame 2 and the sub-frame 3.

On the other hand, the tools 37 to be fed are stored in the tool pockets 31 of the respective tool racks 30 (in this embodiment, 14 tools 37 are stored per each of the tool racks 30). The tool racks 30 with the tools stored therein are, in normal state, integrated one another (excepting the tool racks $30_B$, $30_B$ at the rightmost of the respective frames) as shown in FIG. 9, since the adjacent tool racks 30 are interconnected by the connecting mechanism 32. This integration of the tool racks 30 is made per the main frame 2 and the sub-frame 3 as one unit, respectively. Accordingly, other tool racks 30 than the tool racks $30_B$ at the right extreme of the respective frames fixed to the respective main frame 2 and sub-frame 3 are, when in the connected state, moved along the guide rail 29d and the guide groove 29c as one body, respectively, by means of reciprocal projection of the piston rod 35a of the rack open cylinder 35 of the respective frames projecting in the directions A and B in FIG. 10.

In this way, when the tool robot 10 is brought to be in a correct position opposite to the tool rack 30 including the tool pocket 31 with the tool 37 to be fed stored therein, the piston rods 33a of two unlocking cylinders 33 mounted on the upper and lower portions of the tool robot main body 11 are caused to project in the direction as shown by the arrow D in FIG. 15. As a result, the front end of the piston rod 33a and the unlocking pin 32g of the connecting mechanism 32 of the tool rack 30 are abutted with respect to each other. Furthermore, the unlocking pin 32g is pushed in resisting the biasing force of the coil spring 32i in the direction as shown by the arrow D in FIG. 13. Due to the foregoing, the lock pin 32e is also moved in the direction of D through the pin 32f. As a result, the pin 32a of the tool rack $30_D$ at the right side in FIG. 14 (the tool 37 to be fed is stored in this tool rack $30_D$), which was in a connected state with the lock pin 32e through the connecting groove 32b is canceled the connected state with the lock pin 32e and brought to be in such a state as ready to escape from the connecting hole 32e.

Then, the rack opening cylinder 35 mounted on a frame corresponding either to the main frame 2 or the sub-frame 3 with the tool rack 30, for which the unlock pin 32g is pressed, is driven. As a result, the piston rod 35a is caused to project in the direction as shown by the arrow B in FIG. 10. When the piston rod 35a is projected in the direction as shown by the arrow B, the tool rack $30_A$ fixed to the piston rod 35a and at least one rool rack 30 which is in the connected state with the tool rack $30_A$ through the connecting mechanism 32 starts moving in the direction B (of course, it is feasible that only the tool rack $30_A$ is moved in the direction B depending on circumstances). The tool racks 30 are moved in the direction B in such a manner as that the pin 32a is separated from the engaging hole 32c by serving the tool rack 30 provided with the unlocking pin 32g abutted with the unlocking cyinder 33 and the tool rack $30_D$ at the right side in FIG. 14 which was in the connected state with the tool rack 30 just mentioned through the engaging hole 32c as the boarder line. Among the tool racks 30 which started the movement, between the tool rack $30_D$ at the left side in FIG. 14 and the next tool rack 30 to the left in FIG. 14, a space corresponding to the stroke ST of the rack opening cylinder 35 is formed. The tool racks 30$_A$ and 30$_D$ are coincide with each other in FIGS. 12 and 14. It is noted that this explanation is applicable whether they are coincide or not.

In this way, when all of the tool racks 30 at the right side than the tool rack 30$_D$ provided with the tool 37 to be fed in FIG. 1 are moved to the direction B by stroke ST from, the motor 19 of the tool robot 10 is driven to rotate the feed screw 21 for a suitable angular amount in the normal and reverse directions through the timing belt 20 etc. As a result, the hand mechanical portion 22 engaged with the feed screw 21 is moved along on the main body 11 in the directions as shown by the arrows I and J though the guide rails 11a, 11a. Then, the tool grasping portion 25 provided at the hand mechanical portion 22 is brought to be in alignment with the vertical position of the tool pocket 31 with the tool 37 to be fed stored therein. In this state, the cylinder 23 is driven to cause the piston rod 23a to project in the direction as shown by the arrow D in FIGS. 6 and 7 in such a manner as to slide two guide rods 25a, 25a of the tool grasping portion 25 with respect to the slide bearing 22a.

Figure 3:
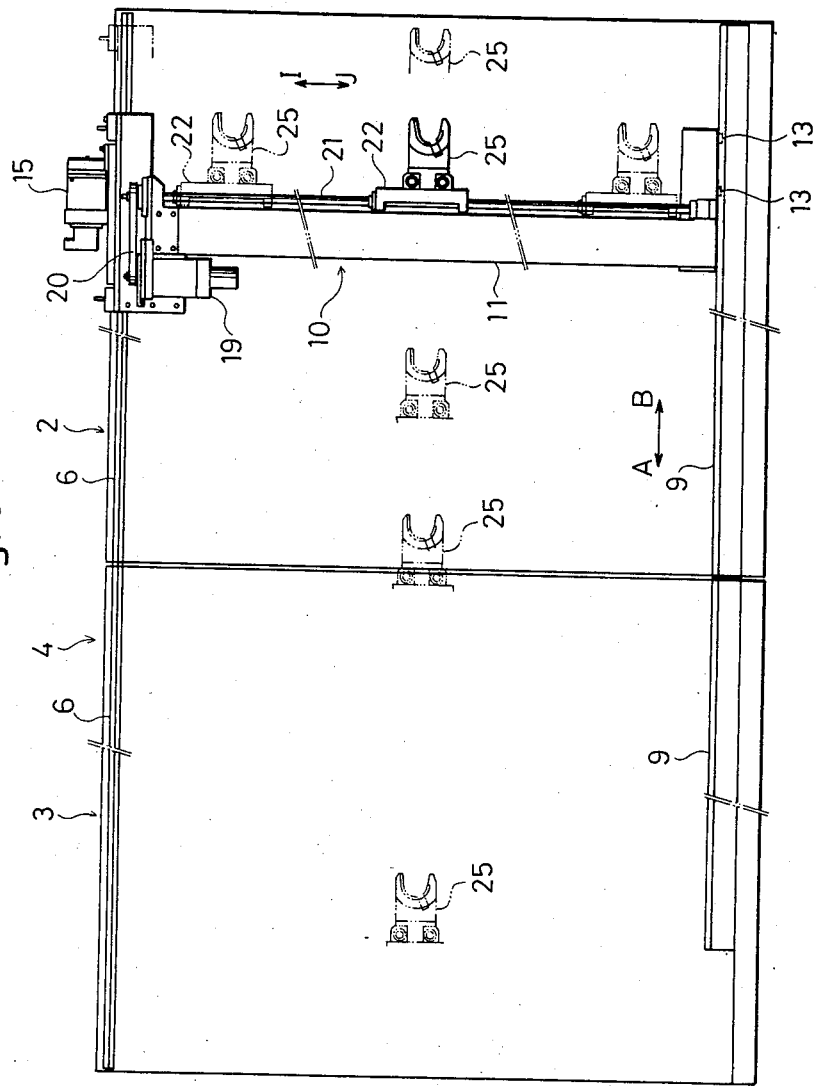
FIG. 3 is a front view showing a tool robot portion.

Consequently, the tool grasping portion 25 is inserted into the space between the tool racks 30 and 30$_D$ opened by the rack opening cylinder 35 without interfering with the tool rack 30 etc., and as shown in FIG. 6, the tool grasping groove 25f of the tool grasping portion 25 and the tool 37 to be fed stored within the tool racks 30$_D$ are brought to be in alignment in phase with respect to the directions as shown by the arrows C and D, and also with respect to the vertical direction in FIG. 3.

Then, the motor 15 is rotated again for a predetermined amount to move the main body 11 together with the tool grasping portion 25 in the direction B. Due to the foregoing, the tool holder of the tools 37 is engaged in the tool grasping groove 25f. In this state, the cylinder 25c is fed with a pressure oil to press the arm 26 in the direction H around the pin 26a so that the tools 37 are firmly held within the tool grasping groove 25f. Since the arm 26 is normally energized by the coil spring 25e toward the side H, even if feed of the pressure oil to the cylinder 25c is suddenly stopped, the tool 37 will not come off from the tool grasping groove 25f. Also, since engagement of the tool 37 into the tool grasping groove 25f is performed in the state that the pressure oil is not fed to the cylinder 25c due to the movement of the tool grasping portion 25 in the direction B toward the tools 37 side, the arm 26 is, while rotating, brought to be engagement in the tool grasping groove 25f resisting the biasing force of the coil spring 25e by the tool holder of the tools 37. Thus, the grasping action with respect to the tool 37 is smoothly performed.

In this way, when the tool 37 is grasped by the tool grasping portion 25, the piston rod 23a of the cylinder 23 is retreated in the direction C. As a result, the tool 37 grasped by the tool grasping portion 25 is separated from the tool pocket 31 to move in the direction C together with the tool grasping portion 25 and then picked up.

When the tool grasping portion 25 is moved in the direction C together with the tool 37, the motor 15 is driven to move the main body 11 in the direction B so that the tool 37 in the above mentioned grasped state is moved so far as to the tool rack 30$_B$ fixedly mounted on the rightmost side of the main frame 2 passing the main frame 2. In the meantime, the motor 19 is driven to suitably move the hand mechanical portion 22 and the tool grasping portion 25 in the directions I and J in order to bring the tool 37 of the tool grasping portion 25 to be in alignment with the vertical position of the intermediate feed pocket 36 of the tool rack 30$_B$.

In the meantime, the rack opening cylinder 35 causes the piston rod 35a to retreat in the direction A. As a result, the plurality of tool racks 30 including the tool rack 30$_A$ which were moved in the direction B till this time are brought back in the direction A. And, as shown in FIG. 14, the pin 32a of the tool rack 32$_D$ from which the tool 37 was picked up is caused to engage in the engaging hole 32c of the tool rack 30 adjacent to the left to the tool rack 30$_D$ which was separated and picked up the tool 37 therefrom as described. Due to the foregoing, the space so far formed is closed. And, a space corresponding to stroke ST of the rack opening cylinder 35 is formed between the tool rack 30$_A$ and the tool rack 30$_B$ at the rightmost side of the main frame 2 or the sub-frame 3. On the other hand, when the pin 32a is inserted in the engaging hole 32c, the pin 32a in brought to be engagement with the the lock pin 32e through the engaging groove 32b in such a manner as to forcedly move the lock pin 32e together with the pin 32f and the unlocking pin 32g in the direction as shown by the arrow D resisting the biasing force of the coil spring 32i. The tool rack 30$_D$ and the tool rack 30 left thereto in FIG. 14 separated till this time are connected through the pin 32a as in the initial state. Since the engagement between the engaging groove 32b and the pin 32e is made through their inclining surfaces 32j and 32k, the connection between the tool rack 30$_D$ and its left side tool rack 30 is smoothly and surely made in such a manner as that both the racks 30 are intimately contacted with each other.

In this way, when all of the tool racks 30 excepting the tool racks 30$_B$ are integrated with respect to the main frame 2 as well as the sub-frame 3 respectively, the tool robot 10 which was brought to be in a position opposite to the intermediate feed pocket 36 of the tool rack 30$_B$ of the main frame 2 actuates the cylinder 23 to project the piston rod 23a in the direction D, so that the tool 37 grasped by the tool grasping portion 25 is inserted in the tool holding portion 36g of the intermediate feed pocket 36. At this time, all of the tool racks 30 excepting the tool racks 30$_B$ are moved in the direction A in FIG. 1. Since a space corresponding to the stroke ST (or more) of the rack opening cylinder 35 is formed between the tool racks 30$_B$ and 30$_A$, even if the tool grasping portion 25 is projected toward the tool rack 30, i.e. in the direction D, the tool grasping member 25 and the tool rack 30 as well as the tool 37 in the tool rack 30 do not interfere with each other. Thus, the tool 37 can be inserted in the tool holding portion 36g smoothly.

When the tool 37 is inserted in the tool holding portion 36g, feed of the pressure oil to the cylinder 25c is broken. In the foregoing state, the main body 11 is moved in the direction A together with the tool grasping member 25. Then, the arm 26 of the tool grasping portion 25 is pivoted in the direction G resisting the biasing force of the coil spring 25e, and disengaged from the tool 37. As a result, the tool 37 is held in the intermediate feed pocket 36 in such a manner as that the lock pin 36t energized in the direction I by the coil spring 36u is engaged in the groove portion 37b of the pull stud 37a as shown in FIG. 17.

Figure 2:
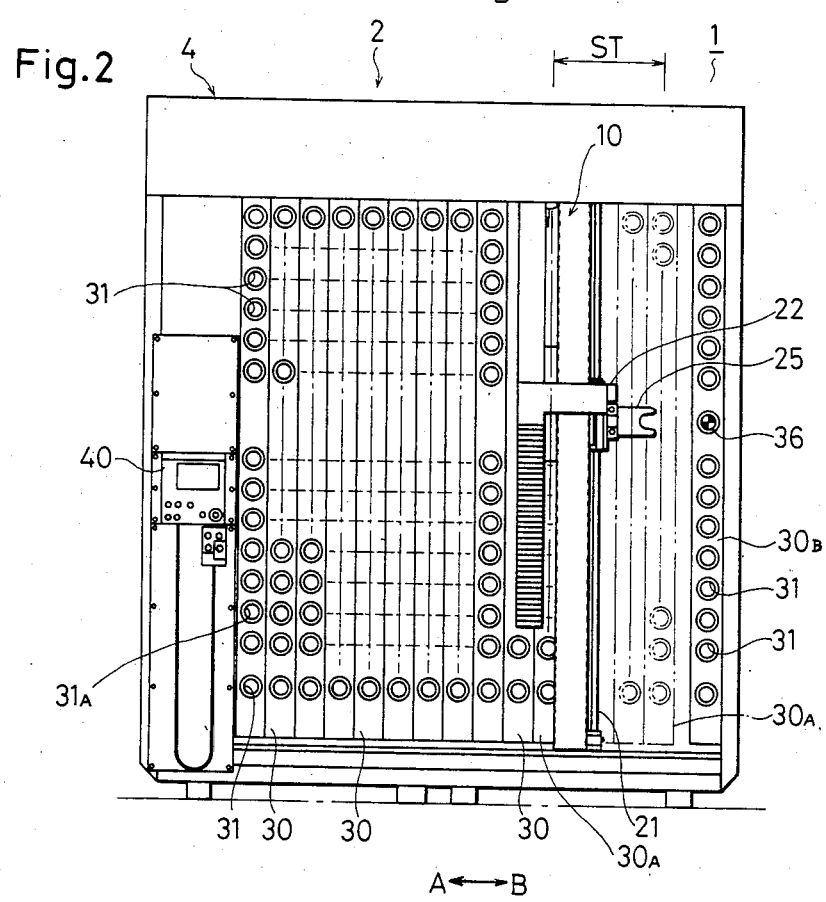
FIG. 2 is a front view showing a main frame portion of the tool storing and feeding apparatus of FIG. 1.

By the way, the tool 37 stored in the intermediate feed pocket 36 is, thereafter, fed again to the machine tool such as a machining center etc. by ATC apparatus (ATC stands for automatic tool changer. Hereinafter referred to as "ATC apparatus") at the machine tool side and mounted on a spindle. While, a tool 37 which was mounted on the spindle of the machine tool and completed in machining work is returned to the intermediate feed pocket 36 by the ATC apparatus. The feeding of the tools 37 to the intermediate feed pockets 36 in the tool storing and feeding apparatus 1 are, as shown in FIGS. 1 through 2, performed by grasping the tools 37, more precisely, the left portions of the tool holders 37c of the tools 37 in FIG. 1 which are stored in the respective tool racks 30. Generally, ACT apparatus at the machine tool side performs changing work of tools by grasping the right side portions thereof in FIG. 1. Accordingly, if the tool holder 37c is symmetric in its shape with respect to the right and left parts thereof, no problem is involved. However, regarding special tools 37 held by an asymmetric tool holder 37c, there arises the inconvenience that if the tool grasping portion 25 grasps the graspable portion at the left side of the tool 37, the tools 37 inserted into the intermediate pockets 36 at the ATC apparatus side can not be grasped if left in the state as they are.

In view of the above, when the tool 37 is set in the intermediate feed pocket 36 by the tool robot 10, the cylinder 36q is driven so that the rod 36r is projected in the direction as shown by the arrow I in FIG. 17. As a result, as shown in FIG. 18, the rotary holder 36b is rotated by 180° through the pinion gear 36p and 36s formed on the rod 36r. Since the rotary holder 36b is, as shown in FIG. 16, provided with the key 36v for engaging in the key groove formed in the tool 37, the tool 37 is rotated by 180° in synchronism with rotation of the rotary holder 36b. On the other hand, when the rotary holder 36b is rotated by 180°, the rotation is transmitted to the shaft 36i through the gears 36l and 36k, which further causes the cleaning holder 36d to rotate in the same direction as that of the rotary holder 36b through the gears 36j and 36h. Then, the cleaning brush 36f mounted on the cleaning holder 36d is rotated together with the cleaning holder 36d to clean out foreign matters such as dust attached to a taper shaft 37d of the tool holder 37c which is intimately contacted with the spindle of the machine tool for holding the tool 37 at the time when the tool 37 is mounted on the spindle. Thus, precise machining work can be obtained. The cleaning holder 36d is rotated for several times while the rotary holder 36b is rotated by 180° due to gear rate. Thus, the taper shaft 37d can be cleaned smoothly in its entire periphery. At the same time, since a compressed air is fed into the tool holding portion 36g through an air feed hole 36w formed in the right end of the frame 36a in FIG. 17 passing through the the rotary holder 36b, the foreign matters such as dust etc. removed by the cleaning brush 36f are discharged outside through a space 38 between the tool 37 and the rotary holder 36b. Thus, the taper shaft 37d is maintained in a clean atmosphere. In this way, when the tool 37 is rotated by 180° within the tool holding portion 36g while cleaning the taper shaft 37d, the graspable side of the tool 37 is brought to be at the grasping side, e.g. the right side in FIG. 1, by ATC apparatus of the machine tool. Thus, the tool 37 is smoothly fed to the machine tool thereafter by ATC apparatus.

On the other hand, regarding the tool 37 returned to the intermediate feed pocket 36 by ATC apparatus, the cylinder 36q is driven to move the rod 36r in the direction J in FIGS. 17 and 18. Then, the rotary holder 36b is rotated by 180° but in the opposite direction through the rack 36s and pinion gear 36p to bring the graspable side of the tool 37 from the right side in FIG. 1 to the left side that the tool robot 10 can grasp. At the same time, the taper shaft 37d of the tool 37 is cleaned by the cleaning brush 36f in the same manner as described. Thus, the taper shaft 37 is maintained in its clean state.

Subsequently, the cylinder 23 of the tool robot 10 is driven to project the piston rod 23a in the direction as shown by the arrow D in FIGS. 6 and 7. As a result, while the distance between the tool rack $30_A$ and $30_B$ in its opened state is maintained ST (or more), the tool grasping portion 25 is entered therein without interfering with the tool rack $30_A$ etc. as described, and brought to be in a position where the tool grasping groove 25f and the tool holder 37c of the tool 37 returned by ATC apparatus within the intermediate feed pocket 36 are in alignment in phases in the directions as shown by the arrows C and D, as well as in the vertical direction in FIG. 3. When the motor 15 is rotated for a predetermined amount to move the main body 11 in the direction B together with the tool grasping portion 25, the tool holder 37c of the tool 37 is brought to be engaged in the tool grasping groove 25f. In this state, the pressure oil is fed to the cylinder 25c to press the arm 26 in the direction H around the pin 26a in order to firmly support the tool 37 in the tool grasping groove 25f in order not to drop off.

In this way, when the tool 37 is grasped by the tool grasping portion 25, the piston rod 23a of the cylinder 23 is retreated in the direction C. As a result, the tool 37 held by the tool grasping member 25 is separated from the intermediate feed pocket 36 and moved in the direction C together with the tool grasping portion 25 and picked up.

When the tool grasping portion 25 is moved in the direction C together with the tool 37, the motor 15 is driven to move the main body 11 in the direction A in order to deliver the tool 37 in the grasped state so far as to the tool rack 30 in which the tool 37 is to be stored. Also, in the meantime, the motor 19 is driven to suitably move the hand mechanical portion 22 as well as the tool grasping portion 25 in the directions I and J, so that the tool 37 of the tool grasping portion 25 is brought to be in a correct position corresponding to the tool pocket 31 of the tool rack 30 to which the tool 37 is to be returned.

In this way, when the tool robot 10 is correctly brought to be in a position opposite to the tool rack 30 including the tool pocket 31 in which the tool 37 is to be stored, the piston rods 33a of two unlocking cylinders 33 provided at upper and lower portions of the tool robot main body 11 are projected in the direction as shown by the arrow D in FIG. 15. Then, the front end of the piston rod 33a and the unlocking pin 32g of the connecting mechanism 32 of the tool rack 30 are brought to be in abutment with respect to each other, and the unlocking pin 32g is further pushed in in the direction as shown by the arrow D in FIG. 13 resisting the biasing force of the coil spring 32i. Due to the foregoing, the lock pin 32c is also moved in the direction D through the pin 32f. As a result, the pins 32a of the adjacent tool rack $30_D$ (this tool rack $30_D$ has the tool pocket 31 in which the tool 37 to be returned is stored) which were in the engaged state through the the lock pin 32e and the engaging groove 32b, are disengaged from the lock pin 32e, and ready to be escaped from the engaging hole 32c in which the pin 32a was engaged.

As a result, the rack opening cylinder 35 mounted on the frame corresponding either to the main frame 2 or the subframe 3 on which the tool rack 30 pressed with the unlocking pin 32g is mounted is driven to project the piston rod 35a in the direction as shown by the arrow B in FIG. 10. When the piston rod 35a is projected in the direction as shown by the arrow B, the tool rack $30_A$ fixed to the piston rod 35a, as well as at least one tool rack 30 which is in the connected state with the tool rack $30_A$ through the connecting mechanism 32 start moving in the direction B. The tool racks 30 are moved in the direction B in such a manner as that the pin 32a is separated from the engaging hole 32c, serving the tool rack 30 provided with the unlocking pin 32g abutted with the unlocking cylinder 33 and the right side tool rack $30_D$ in FIG. 14 which was in engagment with the tool rack 30 through the engaging hole 30c as the boarder line. As a result, a space corresponding to the stroke ST of the rack opening cylinder 35 is formed between the tool rack $30_D$ and the tool rack 30 at the left side thereto in FIG. 14.

In this way, at the time when all of the tool racks 30 at the right side in FIG. 1 than the tool rack $30_D$ portion provided with the tool pocket 31 to which the tool 37 is to return are moved by the stroke ST in the direction B, the main body 11 is moved in the direction B for a predetermined amount, so that the tool 37 of the tool grasping portion 25 and the tool pocket of the tool rack 30 to which the tool 37 is to return are brought to be opposite with respect to each other.

Subsequently, the cylinder 23 is driven to project the piston rod 23a in the direction as shown by the arrow D in FIGS. 6 and 7. As a result, the tool grasping portion 25 is caused to engage in the space between the tool racks 30 and $30_D$ opened by the rack opening cylinder 35 without interfering with the tool rack 30 etc, so that the tool 37 grasped is inserted in the predetermined tool pocket 31 in the tool rack $30_D$.

When the tool 37 is inserted in the tool pocket 31, feed of the pressure oil is broken. In the foregoing state, the main body 11 is moved in the direction A together with the tool grasping portion 25. As a result, the arm 26 of the tool grasping portion 25 is brought to be disengaged from the tool 37 while pivoting in the direction G resisting the biasing force of the coil spring 25e. As a result, the tool 37 is held in the tool pocket 31.

In the foregoing state, the tool grasping portion 25 is returned in the direction C.

And the rack opening cylinder 35 is driven in the direction A in order to integrate again the tool racks 30 which were in a separated state for returning the tool 37 through the connecting mechanism 32. In this way, the returning action by the tool robot 10 is completed. The tool robot 10 is prepared for the next feeding action of the tool 37.

Nextly, setting of the tool 37 with respect to the present tool storing and feeding apparatus will be described.

Among the tool racks 30 mounted on the sub-frame 3 of the tool storing and feeding apparatus 1, the tool pocket 31 third from the bottom of the tool rack 30 at the left side in FIG. 1 is used as a station for attaching and detaching the tools 37. When a worker sets the tools 37 in the tool pockets 31 and collects the tools 37 after used from the respective tool pockets 31 of the respective tool racks 30 of the tool storing and feeding apparatus 1, such operation is performed through these tool pockets $31_A$. That is, when the tool 37 is to be set in the tool pocket 31 of the respective tool racks 30, the tool 37 to be set is set in the tool pocket $31_A$ by hand or through a tool feeding means such as a tool feeding robot etc. In the foregoing state, the tool robot 10 is driven to cause the robot 10 to grasp the tool 37 set in the tool pocket $31_A$. At the same time, the tool 37 is delivered so far as to the tool pocket 31 in which the tool 37 is to be stored and stored therein as in the same manner when the tools 37 are stored in the respective tool pockets 31 from the intermediate feed pocket 36. In this way, the tools 37 to be stored are set in the tool pocket $31_A$ one after another. By storing in the respective tool pockets 31 by the tool robot 10, the tools 37 are set to the tool storing and feeding apparatus 1. The foregoing is also applicable to the case where the tools 37 already set are collected from the respective tool pockets 31. That is, the tools 37 to be collected from the respective tool pockets 31 are delivered by tool robot 10 so far as to the tool pocket $31_A$ serving as the tool attaching and detaching station and mounted therein. The tools 37 are detached and collected by a worker, etc. therefrom. In this way, by using the predetermined tool pocket $31_A$ as the tool attaching detaching station, the tools 37 can be set to a desired place in the tool storing and feeding apparatus 1 by merely attaching into the tool pocket $31_A$ by a worker, etc. Similarly, the collecting of the tools 37 from the tool storing and feeding apparatus 1 can be performed at one place in the tool pocket $31_A$. Thus, much convenience is obtained. Provision of the tool attaching and detaching station is not limited to one place of the tool pocket $31_A$. Instead, it is of course possible to use a plurality of tool pockets 31 as the tool attaching and detaching station.

Furthermore, the tool storing and feeding apparatus 1 according to the present embodiment comprises two frames, namely, one piece of the main frame 2 and one piece of the sub-frame 3. Since the main frame 2 and the sub-frame 3 are of module constitution as shown in FIGS. 1 and 2 which can be freely separated and connected, the frames can be suitably combined depending on numbers of the tools 37 to be fed, for example, only main frame 2, a main frame 2 and a sub-frame 3, and a main frame 2 and a plurality of sub-frames 3. That is, since the main frame 2 and the sub-frame 3 are extendably and connectably provided with travelling guide means such as the guide rails 6, 9 and the rack 7 etc. for the tool robot 10 to travel in the travelling direction of the tool robot 10, the number of the sub-frame 3 can be increased with respect to the main frame 2 according to necessity. Furthermore, if the travelling guide means is connected in such a manner as to penetrate through both the frames, the travelling of the tool robot 10 between both the frames is immediately made possible. Thus, the tools to be fed can be easily increased in number.

Although the tool racks 30 are erected in the vertical direction as shown in FIGS. 1 and 2 in the above embodiment, the tool racks are not necessarily erected. Alternatively, they may be laid down in the horizontal direction.

Also, in the above embodiment, the intermediate feed pocket 36 is provided at the tool rack $30_B$ fixedly provided in the tool storing apparatus 4, the intermediate feed pocket 36 is not necessarily provided at the tool rack 30. Alternatively, it may be of course provided at a suitable place other than the storing apparatus 4.

Furthermore, in the above embodiment, the rack opening cylinder 35 is used as means for moving the tool rack 30. Alternatively, rotary driving means such as a motor etc. may be used as means for moving the tool rack 30 together with a suitable linkage means and a gear mechanism other than reciprocally driving means such as the rack opening cylinder 35. Also, the means for moving the tool racks 30 may be provided on at least one of the tool racks at both ends (the tool rack $30_A$ or the tool rack 30 provided with the tool pocket $31_A$ in the case of the sub-frame 3 in FIG. 1) among the tool racks 30 which are moved as one group by the connecting mechanism 32.

As described in the foregoing, according to the present invention, it includes frames such as a main frame 2, a subframe 3, etc., the frames being provided with guide means such as a guide groove 29c, a guide rail 29d, etc., the guide means being movably provided with a plurality of tool racks 30 in the shape of a band plate, the tool racks 30 being provided with a plurality of tool pockets 31 for storing tools 37 therein and arranged in the longitudinal direction of the tool racks 30. Accordingly, the tools 37 can be stored in the tool racks 30 in high density. Besides, at the time when the tools 37 are delivered and feeding by means for delivering and feeding the tools 37 such as a tool robot 10, etc., interference between the delivery and feed means and the tools 37 of the adjacent tool rack 30 etc., can be prevented, since the tool racks 30 are moved guided by the guide means. Therefore, it is no more required to fixedly provide a distance for avoiding interference between the tool racks 30 with respect to each other. Accordingly, the tool racks 30 can be arranged side by side in a continuous manner. Thus, even several hundreds of tools 37 can be easily stored in a limited space.

Furthermore, since a number of tools 37 can be stored in compact, means for delivering and feeding of the tools 37 between the tool racks 30 and the intermediate delivery pocket 36 can be performed in a short time. Thus, prompt feeding of the tools 37 to the machine tool can be obtained.

Also, in the case the invention is constituted as such that it includes frames such as a main frame 2, a subframe 3, etc., and a plurality of tool racks 30 in the shape of a band plate, the frames being provided with guide means such as a guide groove 29c, a guide rail 29d, etc., the guide means being movably provided with the plurality of tool racks 30, the frames being fixedly provided with at least one tool rack $30_B$, all of the tool racks 30 being provided with a plurality of tool pockets 31 for storing tools 37 therein and arranged in the longitudinal direction of the tool racks 30, in addition to the effects mentioned above, regarding tools 37 set to the stationary tool rack $30_B$, the tools 37 can be immediately attached and detached by the delivery and feed means of the tools 37 without opening in the tool racks 30. Accordingly, where the tools 37 are frequently used, or in the case machining time is so short that if the tools 37 are to be selected by means of a usual opening and shutting action of the tool racks 30, time for delivering and feeding the tools 37 to the machine tool by the delivery and feed means becomes longer than machining time, such tools 37 as mentioned can be attached to the stationary tool rack $30_B$ so that time for opening and shutting the tool racks 30 can be saved. Thus, case-by-case prompt delivery of the tools 37 can be obtained.

Furthermore, in the case the invention is constituted as such that it includes frames such as a main frame 2, a subframe 3, etc., the frames being provided with guide means such a guide groove 29c, a guide rail 29d, etc., the guide means being movably provided with a plurality of tool racks 30 in the shape of a band plate, the tool racks 30 being provided with a plurality of tool pockets 31 for storing tools 37 therein and arranged in the longitudinal direction of the tool racks 30, the tool racks 30 being further provided with connecting means 32 for connecting the tool racks 30 adjacent with respect to one another, at least one of the tool racks 30 being provided with means for driving the tool racks 30 such as a rack opening cylinder 35, etc., the tools 37 can be stored in the tool racks 30 in high density. Besides, at the time when the tools 37 are delivered by tool delivery and feed means such as a tool robot 10, by canceling the interconnecting relation of the tool racks 30 with respect to one another at a predetermined tool rack 30 portion and driving the means for driving the tool racks 30, at least one tool rack 30 is moved as one group in such a manner as to form a space having a distance ST between the tool racks 30 while guided by the guide means. Accordingly, the interference between the delivery and feed means and the tools 37 of the adjacent tool rack 30, etc. can be prevented by means of said formed space. Therefore, it is no more required to fixedly provide a predetermined distance for avoiding interference between the tool racks 30 with respect one another. Accordingly, the tool racks 30 can be arranged side by side in a continuous manner. Thus, even hundreds of tools 37 can be easily stored in a limited space. Moreover, since the driving means for moving the plurality of tool racks by the connecting mechanism 32 may be provided at only the tool rack 30 at one ends of the groups of tool racks 30 to be connected for movement, the construction of the tool storing apparatus can be simplified.

Also, in the case the invention is constituted as such that it includes frames such as a main frame 2, a subframe 3, etc., the frames being provided with guide means such as a guide groove 29c, a guide rail 29d, etc., the guide means being movably provided with a plurality of tool racks 30 in the shape of a band plate, the tool racks 30 being provided with a plurality of tool pockets 31 for storing tools 37 therein and arranged in the longitudinal direction of the tool racks 30, the rool racks 30 being further provided with a connecting mechanism 32 for interconnecting the tool racks 30 adjacent with respect to each other, at least one tool rack 30 among the tool racks 30 being provided with means for driving the tool racks 30 such as a rack opening cylinder 35, etc., means for delivering and feeding the tools 37 such as a tool robot 10 etc. being movably provided, the delivery and feed means being provided with unlocking means such as an unlocking cylinder 33 etc. for unlocking the locked state of a connecting mechanism 32, the tools 37 can be stored in the tool racks 30 in high density. Besides, at the time when the the tools 37 are delivered by the delivery and feed means, the delivery and feed means is brought to be in a position corresponding to the tool rack 30 of destination, and the unlocking means provided on the delivery and feed means is driven to cancel the interconnected relation of the tool racks 30 with respect one another by the connecting mechanism 32 at a predetermined tool rack 30 portion. Furthermore, since the driving means for moving the tool racks 30 causes at least one tool rack 30 to move as one group guided by the guide means in such a manner as to form a space having a distance ST between the tool racks 30, interference between the delivery and feed means and the tools 37 of the adjacent tool rack 30 etc. can be prevented due to the space formed between the tool racks 30 at the time when the tools 37 are attached to and detached from the tool pockets 31. Accordingly, it is no more required to fixedly provide a predetermined distance for avoiding the interference between the tool racks with respect to one another. Thus, the tool racks 30 can be arranged side by side in a continuous manner, and even hundreds of tools 37 can be easily stored in a limited space.

Also, since the unlocking means for canceling the connected state of the connecting mechanism 32 is provided on the delivery and feed means, unlocking means is no more required to provide at each of the tool racks by moving the delivery and feed means in the directions A and B. Thus, the apparatus 1 can be simplified in its construction.

Although the present invention has been described in its preferred form, the embodiment described in this specification is utilized for purposes of exemplifying the invention and not in limitation thereof. The scope of the invention is defined in the apended claims and is by no means limited in the description of the embodiment. Accordingly, it should be understood that all alternations and modifications which belong to the claims are considered to be within the scope of the present invention.

What is claimed is:

1. A tool storing apparatus comprising:
   a frame, defining a plane having perpendicular longitudinal and latitudinal axes;
   a plurality of tool racks located within said frame, each tool rack being longer along the longitudinal axis than along the latitudinal axis, said tool racks being mounted so as to be moveable along the latitudinal axis so as to define a predetermined space between two adjacent tool racks;
   guide means, located within said frame, for guiding the motion of said tool racks; and
   a plurality of tool pockets, arranged longitudinally in each tool rack for storing tools therein, each tool having a tool holder associated therewith.

2. A tool storing apparatus comprising:
   a frame, defining a plane having longitudinal and latitudinal axes;
   a plurality of tool racks located within said frame, each tool rack being longer along the longitudinal axis than along the latitudinal axis, said tool racks being mounted so as to be moveable along the latitudinal axis, except one being fixed;
   guide means, located within said frame for guiding the motion of said tool racks;
   a plurality of tool pockets, arranged longitudinally in each tool rack therein for storing tools herein.

3. A tool storing apparatus comprising:
   a frame, defining a plane having longitudinal and latitudinal axes;
   a plurality of tool racks, located within said frame, each tool rack being longer along the longitudinal axis than along the latitudinal axis, said tool racks being mounted so as to be moveable along the latitudinal axis;
   guide means, located within said frame for guiding the motion of said tool racks;
   a plurality of tool pockets, longitudinally arranged in each tool rack for storing tools therein;
   connecting means, attached to said tool racks, for interconnecting adjacent tool racks; and
   driving means, connected to at least one of said tool racks, for moving said tool racks in said latitudinal direction.

4. A tool storing apparatus comprising:
   a frame, defining first a plane having longitudinal and latitudinal axes;
   a plurality of tool racks located within said frame, each tool rack being longer along the longitudinal axis than along the latitudinal axis, said tool racks being mountable so to be moveable along the latitudinal axis;
   guide means, located within said frame for guiding the motion of said tool racks;
   a plurality of tool pockets, longitudinally arranged in each tool pocket for storing tools therein;
   connecting means, attached to said tool racks, for interconnecting adjacent tool racks;
   driving means, attached to at least one of said tool racks for moving said tool racks along the latitudinal axis;
   means for delivering and feeding tools, connected to said frame, which moves along a second plane parallel to said first plane and which removes or replaces a tool out of or into a pocket; and
   means for cancelling the connection of adjacent tool racks caused by said connecting mechanism, included within said delivery and feeding means, such that said delivery and feeding means can be oriented between two adjacent tool racks, separated by said driving means, and therefrom remove or replace a tool out of or into a tool pocket.

* * * * *